(12) United States Patent
Kogo

(10) Patent No.: US 10,168,505 B2
(45) Date of Patent: Jan. 1, 2019

(54) IMAGING APPARATUS

(71) Applicant: HITACHI KOKUSAI ELECTRIC INC., Tokyo (JP)

(72) Inventor: Kiyotaka Kogo, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 15/775,193

(22) PCT Filed: Oct. 18, 2016

(86) PCT No.: PCT/JP2016/080837
§ 371 (c)(1),
(2) Date: May 10, 2018

(87) PCT Pub. No.: WO2017/081998
PCT Pub. Date: May 18, 2017

(65) Prior Publication Data
US 2018/0321464 A1 Nov. 8, 2018

(30) Foreign Application Priority Data

Nov. 12, 2015 (JP) ................................. 2015-222147

(51) Int. Cl.
*G02B 7/36* (2006.01)
*H04N 5/232* (2006.01)
*G03B 13/36* (2006.01)

(52) U.S. Cl.
CPC .............. *G02B 7/36* (2013.01); *G03B 13/36* (2013.01); *H04N 5/23212* (2013.01)

(58) Field of Classification Search
CPC ....... G02B 7/36; G03B 13/36; H04N 5/23212
(Continued)

(56) References Cited

U.S. PATENT DOCUMENTS 5,768,405 A * 6/1998 Makram-Ebeid ..... G06T 7/0012
382/128
5,841,251 A * 11/1998 Vroemen ............... H04N 17/00
348/181

(Continued)

FOREIGN PATENT DOCUMENTS

JP 2008-287091 A 11/2008
JP 2010-130393 A 6/2010
(Continued)

OTHER PUBLICATIONS

International Search Report dated Jan. 24, 2017.

*Primary Examiner* — Antoinette T Spinks
(74) *Attorney, Agent, or Firm* — Bacon & Thomas, PLLC

(57) ABSTRACT

An imaging apparatus includes an AF evaluation value calculation unit for calculating an AF evaluation value by integrating a focus differential signal value. The AF evaluation value calculation unit includes a high luminance region determination unit for extracting a feature of each pixel value and determining whether or not the feature is a backlight scene in a dark place, and a band determination unit for determining a band of a contour component of a subject. A focus differential signal value on a low luminance region side in a contour component formed by a boundary between a high luminance region and a low luminance region due to backlighting is excluded from the integration, and the AF evaluation value is calculated using only a focus differential signal value on the high luminance region side in the contour component of the subject to be focused as an object for the integration.

4 Claims, 4 Drawing Sheets

(58) Field of Classification Search
USPC .......................................................... 348/345
See application file for complete search history.

(56) References Cited

U.S. PATENT DOCUMENTS

| 2008/0284901 A1 | 11/2008 | Misawa |
| 2010/0134649 A1 | 6/2010 | Kamimura et al. |
| 2013/0107107 A1 | 5/2013 | Ohbuchi et al. |
| 2013/0201386 A1 | 8/2013 | Ohbuchi et al. |

FOREIGN PATENT DOCUMENTS

| JP | 2011-150281 A | 8/2011 |
| JP | 2013-097082 A | 5/2013 |
| JP | 2013-160919 A | 8/2013 |

\* cited by examiner

IMAGE OF BACKLIGHT SCENE IN DARK PLACE AT FOCUSING

DIFFERENTIAL IMAGE OF IMAGE IN FIG. 3A

IMAGE OF BACKLIGHT SCENE DARK PLACE AT NON-FOCUSING

DIFFERENTIAL IMAGE OF IMAGE IN FIG. 3C

IMAGE OF BACKLIGHT SCENE IN DARK PLACE AT FURTHER NON-FOCUSING

DIFFERENTIAL IMAGE OF IMAGE IN FIG. 3E

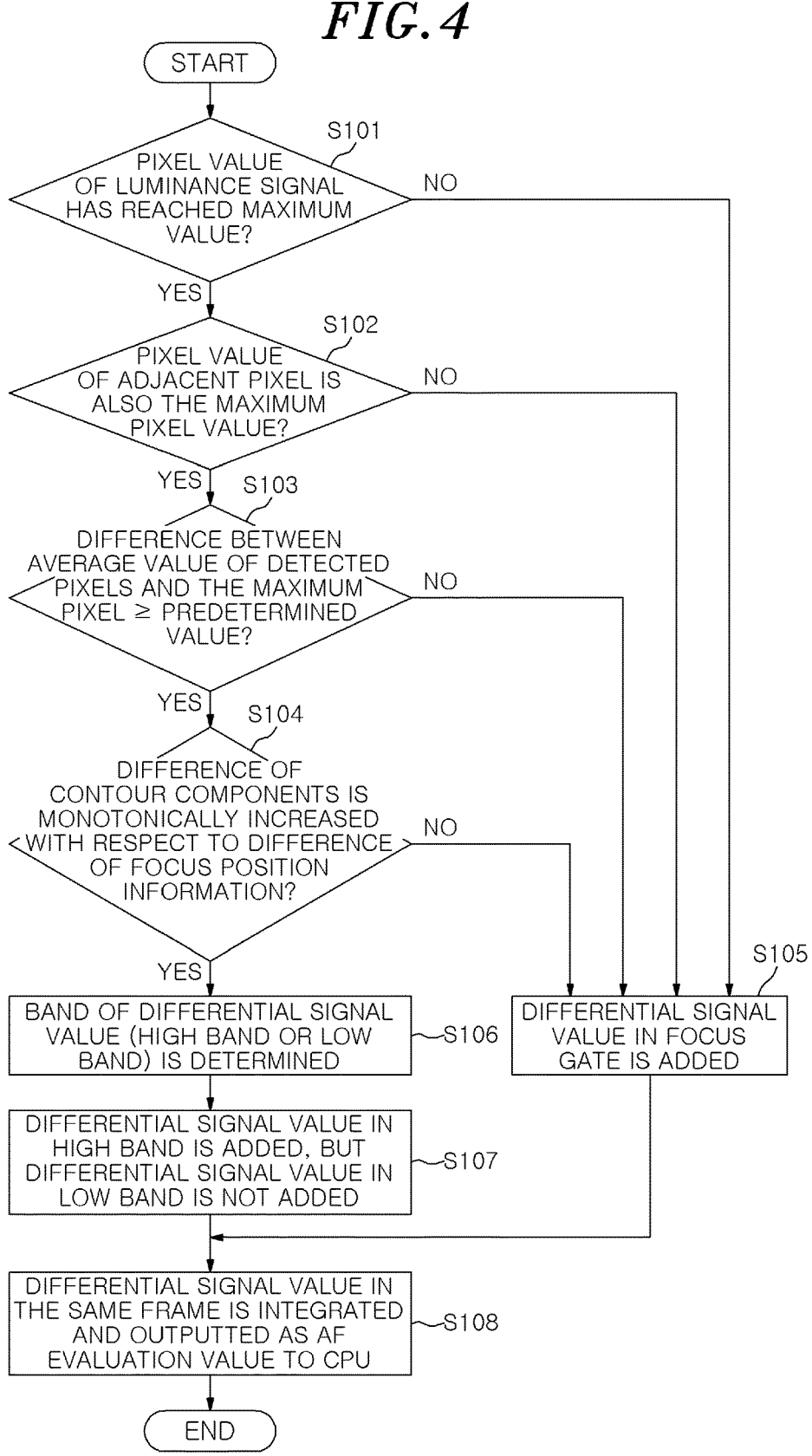

IMAGING APPARATUS

FIELD OF THE INVENTION

The present invention relates to an imaging apparatus having an autofocus function using a contrast detection method.

BACKGROUND OF THE INVENTION

For example, Japanese Patent Application Publication No. 2009-020304 discloses an autofocus method in which an image signal is obtained by projecting an image of a subject which is picked up by an imaging lens onto an imaging device and a focusing point of the subject is obtained by controlling a focus position of the imaging lens. In this method, it is determined whether or not the subject is backlighted, and based on the result, an autofocus detection area for the subject is switched between a backlight state and a non-backlight state. In the backlight state, a focusing position of the subject is detected from an edge of the subject in the detection area in an output signal of the imaging device.

For surveillance purposes, a backlight scene may be generated in a dark place such as nighttime or the like. For example, spot light may be directly applied by a strong light source such as illumination light or the like to the vicinity of a subject to be focused. In a general contrast detection autofocus method, a focus lens is moved to a position where a high frequency component (differential component) of an image signal becomes maximum.

However, in a backlight scene in a dark place, a contrast difference between a high luminance (highlight) region such as spot light generated by illumination light and a low luminance region such as a surrounding dark part becomes relatively higher than a contrast difference of contour components of the subject seen at the time of focusing. Therefore, particularly if a differential signal is used for a focus signal (AF (Automatic Focus) evaluation value) in a scene having relatively few differential signal components from the subject, the influence of the spot light becomes stronger, which makes normal operation of autofocus difficult. In other words, the spot light of the illumination device spreads as it is deviated from the in-focus position. Accordingly, the contour also becomes greater, and the focus signal becomes greater.

Thus, it is required to distinguish a differential signal from a boundary between a high luminance region and a low luminance region due to illumination light or the like and a differential signal of a contour component of a subject seen at the time of focusing in a backlight scene in a dark place and determine whether or not it is added as an AF evaluation value.

SUMMARY OF THE INVENTION

In view of the above, the present invention provides an imaging apparatus capable of improving focus detection performance in the case of picking up an image of a backlight scene in a dark place where illumination light such as spot light or the like exists near a subject to be imaged.

In accordance with an aspect of the present invention, there is provided an imaging apparatus including: an AF (Automatic Focus) evaluation value calculation unit configured to calculate an AF evaluation value by integrating, in a single frame period, a focus differential signal value obtained from a focus differential signal generated by obtaining a high frequency component of a luminance signal included in an image signal obtained by photoelectric conversion of a subject image formed by a focus lens through an imaging device and time-differentiating the obtained luminance signal; and a control unit configured to control a position of the focus lens to maximize the AF evaluation value based on the AF evaluation value inputted from the AF evaluation value calculation unit, wherein the AF evaluation value calculation unit includes: a high luminance region determination unit configured to extract a feature of each pixel value and determine whether or not the feature is a backlight scene in a dark place; and a band determination unit configured to determine a band of a contour component of a subject, wherein in the band determination unit, when the high luminance region determination unit determines the feature is a backlight scene in a dark place, a focus differential signal value on a low luminance region side in a contour component formed by a boundary between a high luminance region and a low luminance region due to backlighting is excluded from an object for the integration, and the AF evaluation value is calculated using only a focus differential signal value on the high luminance region side in the contour component of the subject to be focused as an object for the integration.

Further, the high luminance region determination unit may determine whether or not the feature is a backlight scene in a dark place based on correlation of a difference between temporal variation of position information of the focus lens and temporal variation of contour components formed by the boundary between the high luminance region and the low luminance region due to the backlighting.

Furthermore, the control unit may include a storage unit configured to store the AF evaluation value inputted from the AF evaluation value calculation unit together with position information of the focus lens.

Effects of the Invention

In accordance with the present invention, it is possible to improve focus detection performance in the case of picking up an image of a backlight scene in a dark place where illumination light such as spot light or the like exists near a subject to be imaged.

BRIEF DESCRIPTION OF THE DRAWINGS

FIG. 4 is a flowchart showing signal processing in the AF evaluation value calculation unit of the imaging apparatus according to the embodiment.

DETAILED DESCRIPTION OF THE EMBODIMENTS

Hereinafter, an imaging apparatus according to an embodiment of the present invention will be described.

In the imaging apparatus according to the embodiment of the present disclosure, an AF evaluation value calculation unit is provided with a high luminance region determination unit and a band determination unit. Accordingly, by reducing detection of a contour component (low band focus differential signal component) formed by a boundary between a high luminance region and a low luminance region by an illumination light or the like and maximizing a contour component (high band focus differential signal component) of the subject to be focused as an AF evaluation value, the focus detection performance can be improved.

(Control Scheme of Imaging Apparatus)

Figure 1:
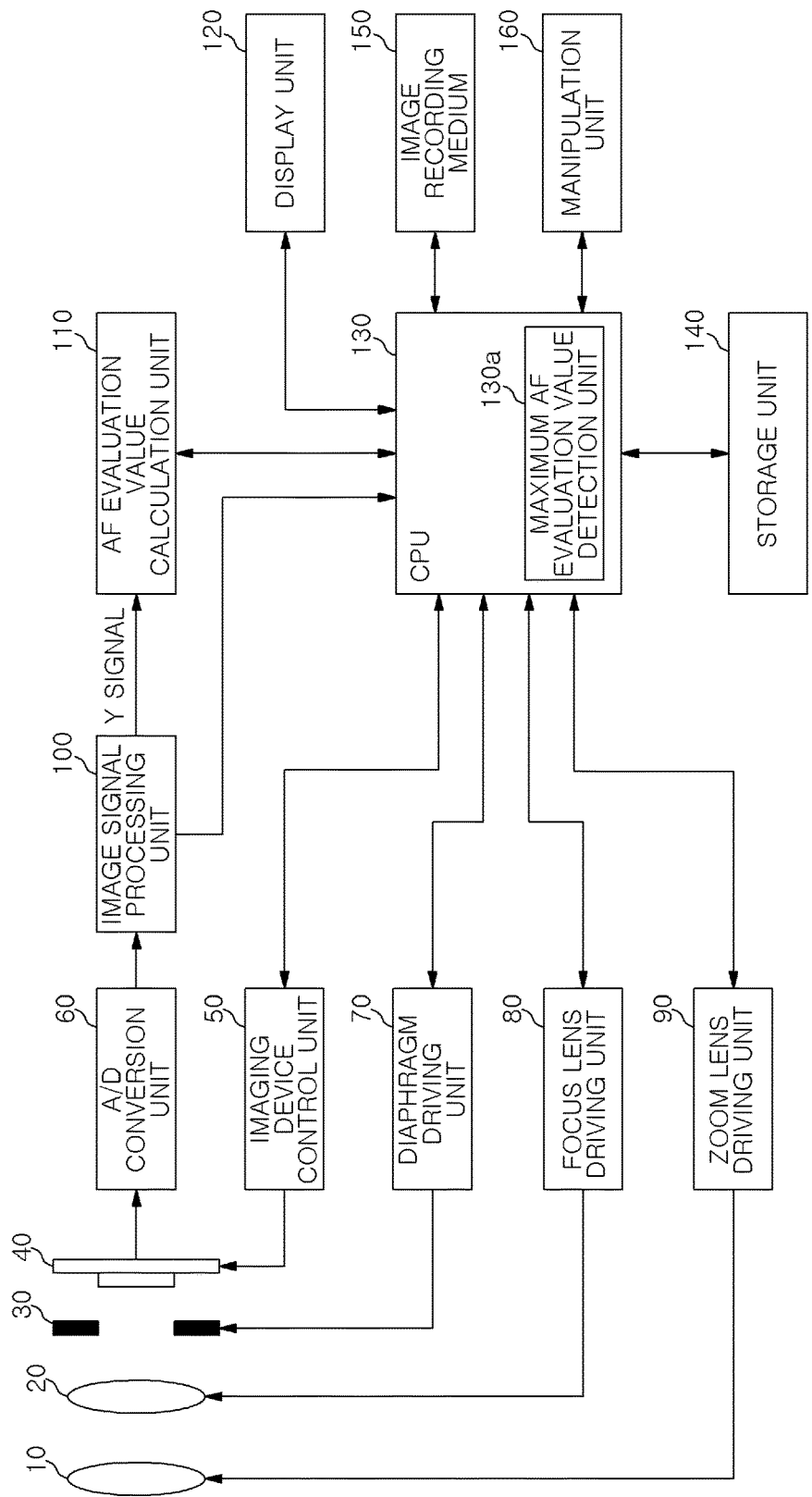
FIG. 1 is a block diagram showing an example of a configuration of an imaging apparatus according to an embodiment of the present invention.

A control scheme of the imaging apparatus according to the embodiment of the present disclosure will be described with reference to FIG. 1. FIG. 1 is a block diagram showing an example of a configuration of the imaging apparatus according to the embodiment of the present invention. The imaging apparatus 1 shown in FIG. 1 is, e.g., a digital video camera.

The imaging apparatus 1 according to the embodiment of the present invention includes a zoom lens 10, a focus lens 20, a diaphragm mechanism 30, an imaging device 40, an imaging device control unit 50, an A/D conversion unit 60, a diaphragm driving unit 70, a focus lens driving unit 80, a zoom lens driving unit 90, an image signal processing unit 100, an AF evaluation value calculation unit 110, a display unit 120, a CPU 130, a storage unit 140, an image recording medium 150, and a manipulation unit 160.

The zoom lens 10 is used for enlarging a subject. The focus lens 20 is focused on the subject. The diaphragm mechanism 30 includes a diaphragm, a filter and the like. The diaphragm mechanism 30 is used for controlling the amount of exposure.

The imaging device 40 photoelectrically converts an image inputted through the zoom lens 10 and the focus lens 20 into an electrical signal (image signal) and outputs it to the A/D conversion unit 60. The imaging device 40 is a solid state imaging device such as a CCD (Charge Coupled Device) image sensor, a CMOS (Complementary Metal Oxide Semiconductor) image sensor, or the like.

When the imaging device 40 is a CCD, the A/D conversion unit 60 includes a CDS (Correlated Double Sampling) unit for performing a correlated double sampling process on an image signal (analog image data) from the imaging device 40, an AGC (Automatic Gain Control) unit for performing automatic gain control, and an ADC (Analog Digital Conversion) unit for performing A/D conversion.

The image signal processing unit 100 receives the image signal digitally converted through the imaging device 40 and the A/D conversion unit 60, and performs processing such as fixed pattern noise removal, shading correction, demosaicing (in the case of a Bayer filter sensor), time/spatial filter processing, size conversion, color correction, gamma, and the like. Then, the image signal processing unit 100 outputs it to the CPU 130 and also outputs a luminance signal Y to the AF evaluation value calculation unit 110. It is assumed that the image signal displayed on the display unit 120 changes in time series by the imaging device control unit 50.

The AF evaluation value calculation unit 110 calculates an AF evaluation value based on the luminance signal Y input from the image signal processing unit 100, and outputs the calculated AF evaluation value to the CPU 130. This will be described in detail later.

The imaging device control unit 50 transmits a driving signal to the imaging device 40 and realizes an electronic shutter function of electrically controlling exposure timing.

The focus lens driving unit 80 moves the focus lens 20 along an optical axis direction by driving a pulse motor (not shown) in response to the control signal supplied from the CPU 130. The focus lens driving unit 80 may detect the position of the focus lens 20 and inform the CPU 130 of the detection result. However, its absolute accuracy is low.

The zoom lens driving unit 90 moves the zoom lens 10 along the optical axis direction by driving a pulse motor (not shown) in response to the control signal supplied from the CPU 130.

The diaphragm driving unit 70 drives the diaphragm mechanism 30 in response to the control signal supplied from the CPU 130 and opens/closes the diaphragm of the diaphragm mechanism 30 depending on, e.g., the amount of light.

Each of the driving units 70, 80, and 90 is controlled by a program loaded into the CPU 130 from the storage unit 140.

The CPU 130 performs signal processing of the imaging apparatus 1 and overall control based on the program loaded from the storage unit 140. Further, the CPU 130 includes a maximum AF evaluation value detection unit 130a and moves the focus lens 20 within a predetermined AF sampling range. The CPU 130 stores the AF evaluation value inputted from the AF evaluation value calculation unit 110 for each frame together with the lens position information and moves the focus lens 20 to the focus lens position at the time of focusing by using the focus lens driving unit 80 while considering the maximum AF evaluation value detected by the maximum AF evaluation value detection unit 130a among the stored AF evaluation values as a focusing point. Further, the CPU 130 receives the luminance data of the image signal from the image signal processing unit 100 and determines it as an AE (Automatic Exposure) evaluation value. The CPU 130 drives the diaphragm driving unit 70 to open/close the diaphragm of the diaphragm mechanism 30 and also drives the imaging device control unit 50 to vary a shutter speed and control an optimal amount of light.

The storage unit 140 stores various programs. The image recording medium 150 records captured images. The manipulation unit 160 instructs shutter button input or the like from the outside. The display unit 120 is, e.g., an LCD (Liquid Crystal Display) monitor or an organic EL (Electro-Luminescence) monitor. Further, the display unit 120 may be a touch panel sensing contact of a user's finger.

(Control Scheme of AF Evaluation Value Calculation Unit)

Figure 2:
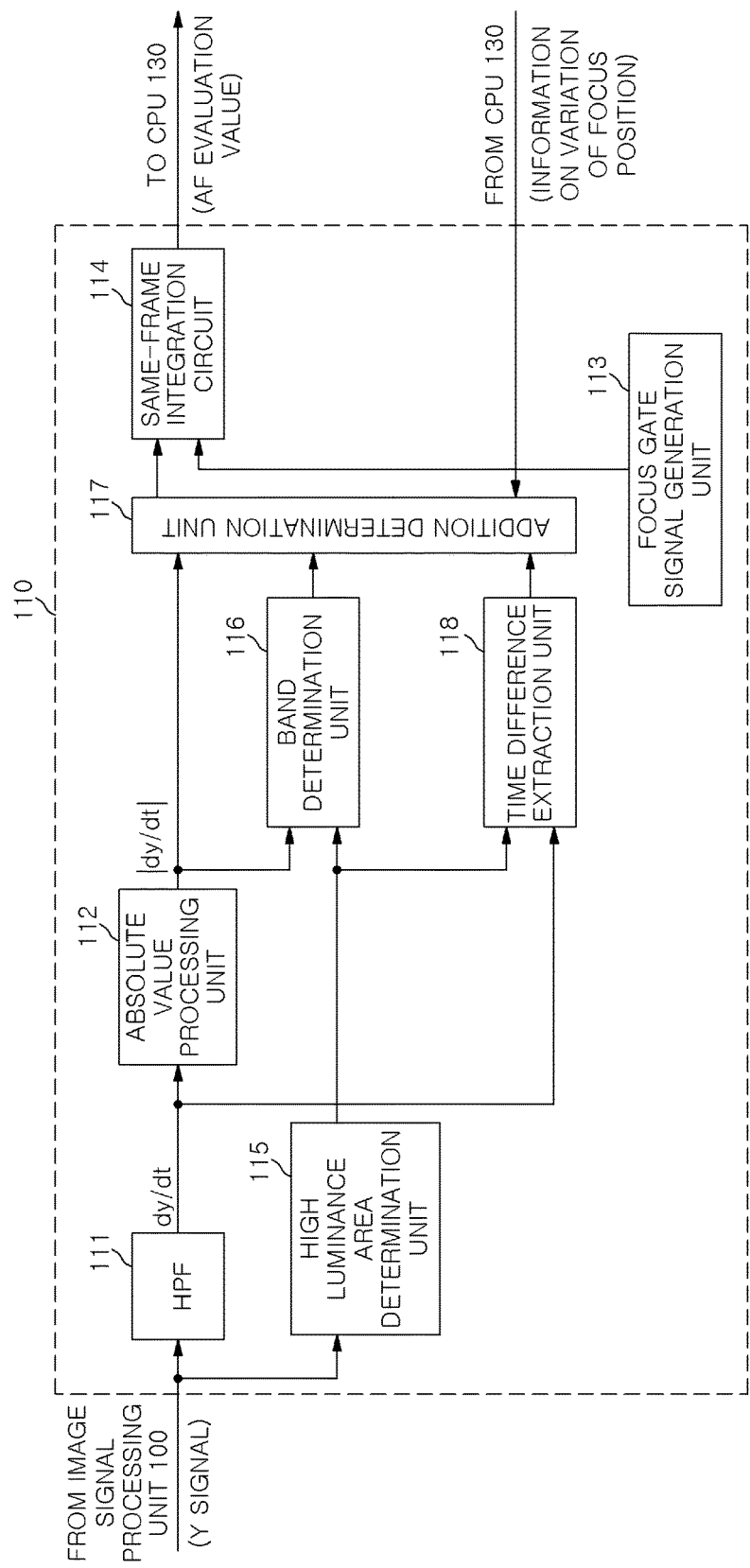
FIG. 2 is a block diagram showing an example of a configuration of an AF evaluation value calculation unit of the imaging apparatus according to the embodiment.

Next, a control scheme of the AF evaluation value calculation unit 110 of the imaging apparatus 1 according to the embodiment of the present invention will be described with reference to FIG. 2. FIG. 2 is a block diagram showing an example of a configuration of the AF evaluation value calculation unit of the imaging apparatus according to the embodiment of the present invention.

The AF evaluation value calculation unit 110 of the present invention includes an HPF (High-pass filter) 111, an absolute value processing unit 112, a high luminance area determination unit 115, a band determination unit 116, a time difference extraction unit 118, an addition determination unit 117, a same-frame integration circuit 114, and a focus gate signal generation unit 113.

The HPF 111 calculates a high frequency component in a horizontal direction for each pixel in the luminance signal Y of all pixels of one frame inputted from the image signal processing unit 100. For example, a difference in the luminance between pixels adjacent in the horizontal direction is obtained by time differentiation of the luminance signal Y and outputted as a differential signal (dY/dt).

In order to extract a magnitude of the differential signal component, the absolute value processing unit 112 converts the differential signal (dY/dt) inputted from the HPF 111 into an absolute value, and outputs it as a differential signal value (|dY/dt|) to the addition determination unit 117, the band determination unit 116, and the time difference extraction unit 118.

The high luminance region determination unit 115 determines whether or not a high luminance region exists by extracting features of pixel values that can be considered as a high luminance region in a backlight scene from the luminance signal Y inputted from the image signal processing unit 100, and outputs the high luminance area information to the band judgment unit 116. For example, it is determined as the high luminance region when a blob of a pixel has a luminance greater than or equal to a first predetermined value (near a saturation level) and its luminance difference with respect to an adjacent pixel (in a horizontal direction) is smaller than or equal to a second predetermined value and also when the surrounding luminance is smaller than a third predetermined value. While the focus is moving, the determined high luminance region is stored. Even if the focus is moving to a non-focusing position, the detection of the high luminance region may be maintained by gradually decreasing the first predetermined value near the stored region.

Although it is preferable that the high luminance region determination unit 115 detects a large amount of spot light as the high luminance region, the high luminance region may include a part (subject) other than spot light. When it is difficult to determine the high luminance region in real time in a current processing frame, the determination result obtained based on a previous frame may be outputted.

The band determination unit 116 determines a frequency band of a contour component of each high luminance region based on the differential signal value from the absolute value processing unit 112, and outputs it to the addition determination unit 117. The band may be determined by comparing an input amplitude and an output amplitude by providing the HPF or the differential circuit in the band determination unit 116. In addition, the band may be determined by using the number of consecutive positive (or negative) values in the differential signal from the HPF 111 or by using a moving average value of the differential signal or the like. The operations from the HPF 111 to the band determination unit 116 are performed for each pixel.

The time difference extraction unit 118 has a memory for storing a differential signal value inputted from the absolute value processing unit 112 for each frame. The time difference extraction unit 118 extracts temporal variation between frames of the differential signal value and outputs the extracted temporal variation to the addition determination unit 117. The temporal variation may be extracted only from the contour of each high luminance region. The memory may record only the vicinity of each high luminance region.

The focus gate signal generation unit 113 generates a focus gate signal indicating a focus detection area and outputs it to the same-frame integration circuit 114.

Based on the band determination information from the band determination unit 116, the addition determination unit 117 performs control such that the high band differential signal value derived from the subject is added to the differential signal value inputted from the absolute value processing unit 112 and the low band frequency differential signal value derived from the contour of the highlight area is not added thereto.

The same-frame integration circuit 114 integrates the differential signal value in the same frame inputted from the addition determination unit 117 based on the focus gate signal inputted from the focus gate signal generation unit 113 and outputs it as an AF evaluation value to the CPU 130 on a frame period basis.

(Operation of AF Evaluation Value Calculation Unit)

Next, the operation of the AF evaluation value calculation unit 110 will be described with reference to FIGS. 2 and 3A to 3F.

FIGS. 3A to 3F show examples of images obtained by taking a backlight scene in a dark place while moving the focus lens at a predetermined speed.

Figure 3A:
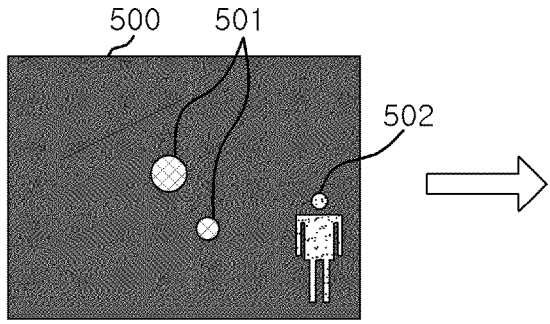
FIGS. 3A to 3F show examples of images obtained by taking a backlight scene in a dark place while moving a focus lens at a predetermined speed.
Figure 3B:
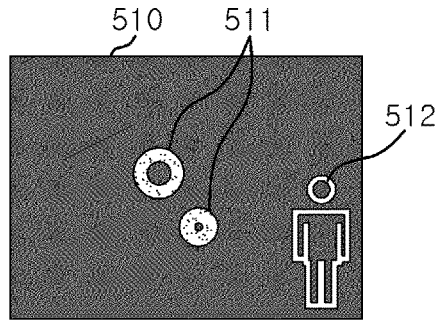

FIG. 3A shows an image 500 of a backlight scene in a dark place which is taken by the imaging apparatus 1 at the time of focusing. A reference numeral 501 denotes a high luminance region formed due to the illumination light. A reference numeral 502 denotes a subject to be focused. FIG. 3B shows a differential image 510 obtained by performing HPF processing on the image 500 shown in FIG. 3A. A reference numeral 511 denotes a contour component formed by a boundary between a high luminance region and a low luminance region due to the illumination light. A reference numeral 512 denotes a contour component formed by the subject 502 to be focused. Here, it is assumed that the illumination light and the subject are present at substantially the same distance from the imaging apparatus 1.

Figure 3C:
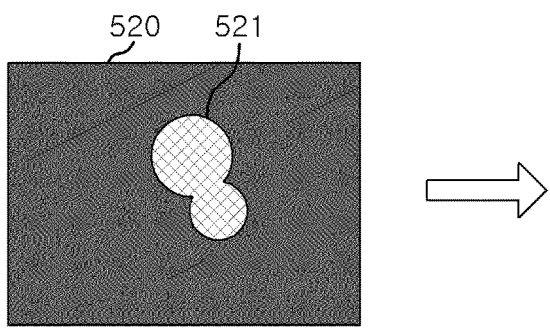
Figure 3D:
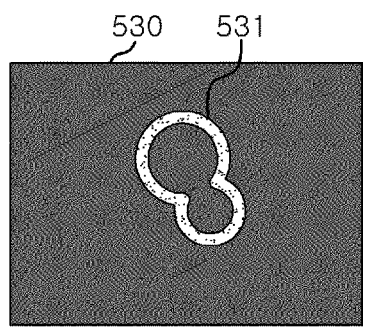

FIG. 3C shows an image 520 of a backlight scene in a dark place which is taken by the imaging apparatus 1 at the time of non-focusing. A reference numeral 521 denotes a high luminance region formed due to the illumination light. FIG. 3D shows an image 530 obtained by performing time differentiation on the image 520 shown in FIG. 3C by the HPF 111. A reference numeral 531 denotes a contour component formed by the boundary between the high luminance region and the low luminance region due to the illumination light.

Figure 3E:
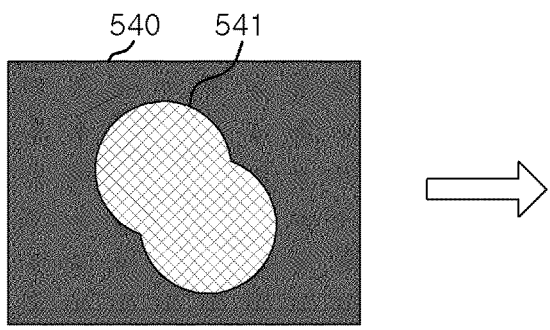

FIG. 3E shows an image 540 of a backlight scene in a dark place at the time of non-focusing which is further away from the focusing position compared to that in FIG. 3C.

Figure 3F:
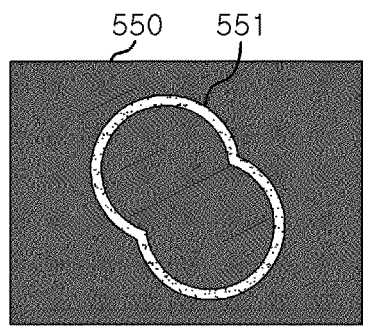

A reference numeral 541 denotes a high luminance region formed due to the illumination light. FIG. 3F shows an image 550 obtained by performing time differentiation on the image 540 shown in FIG. 3E by the HPF 111. A reference numeral 551 denotes a contour component formed by the boundary between the high luminance region and the low luminance region due to the illumination light.

As shown in FIG. 3A, in the case of focusing on the illumination light, the high luminance region 501 formed due to the illumination light is relatively narrow. As shown in FIG. 3B, in a dark part, the contour component 512 formed by the subject may become a frequency component of a relatively high luminance region due to the detail of the subject.

When the imaging apparatus 1 is not focused, the high luminance regions 521 and 541 formed due to the illumination light become wider in a circular shape as can be seen from FIGS. 3C and 3E. Since the diaphragm of the diaphragm mechanism 30 is opened to the maximum at the time of picking up an image in a dark place, the shape of the high luminance region 521 is rounded (blurred) regardless of the shape of the diaphragm, and the luminance inside the region 521 is relatively constant. The luminance in the contour considerably changes (decreases) from a maximum value to a value close to a minimum value from the inside to the outside of the region 521. However, the changes thereof are comparatively gradual (monotonous). As shown in FIGS. 3D and 3F, the contour components 531 and 551 formed by the boundary between the high luminance region and the low luminance region due to the illumination light have a large width and may become a frequency component in a relatively low luminance region.

In the present embodiment, the high luminance region determination unit 115 extracts features of pixel values that can be considered as a backlight scene. The band determination unit 116 determines the focus differential signal value of the low luminance region side to be the contour components 511, 531 and 551 formed by the boundary between the high luminance region and the low luminance region due to the illumination light, because the contour component 512 (see FIG. 3B) of the subject to be focused is a relatively high luminance region whereas the contour components 511, 531 and 551 (see FIGS. 3B, 3D and 3F) formed by the boundary between the high luminance region and the low luminance region due to the illumination light that causes an error detection is a relatively low luminance region. The addition determination unit 117 excludes the low band differential signal value from an addition target as the AF evaluation value and determines only the focus differential signal value of the high luminance region side which is the contour component of the subject to be focused as an addition target.

As shown in FIGS. 3A to 3F, as the amount of deviation of the focus position from the focusing position is increased, the area of the high luminance regions 501, 521 and 541 formed due to the illumination light is expanded and, thus, the contour components 511 and 531 and 551 are also increased. In other words, the behavior opposite to that of the original focus evaluation value is exhibited.

At this time, the CPU 130 detects temporal variation of the focus position information of the focus lens 20 and also detects temporal variation of the contour component formed by the boundary between the high luminance region and the low luminance region due to the illumination light. Accordingly, the backlight scene in the dark place can be estimated from the correlation of the difference therebetween (in the case of monotonic increase). The time difference extraction unit 118 performs processing related thereto.

(Signal Processing in AF Evaluation Value Calculation Unit)

Next, the signal processing in the AF evaluation value calculation unit 110 of the imaging apparatus 1 according to the embodiment of the present invention will be described with reference to FIG. 4. FIG. 4 is a flowchart showing the signal processing in the AF evaluation value calculation unit of the imaging apparatus according to the embodiment of the present invention.

It is determined whether or not the pixel value of the luminance signal Y has reached the maximum value for each pixel in the focus detection area (one frame) (step S101). If the pixel value has reached the maximum value (YES), the processing proceeds to a step S102. If the pixel value has not reached the maximum value (NO), the processing proceeds to a step S105.

When the pixel value of the luminance signal has reached the maximum value in the step S101, it is determined whether or not the pixel value of the pixel adjacent to the pixel having the maximum pixel value is the maximum pixel value (the difference in the pixel value is zero), i.e., whether or not the maximum pixel value is continuous (step S102). If so (YES), it is extracted as the feature of the high luminance region formed due to the illumination light in the backlight scene in the dark place.

In conventional automatic exposure control, an integrated pixel value of the luminance signal in the pixel area as an auto focus detection target is often set to an appropriate value (appropriate image output level). Therefore, there is a constant difference between the maximum pixel value (bright part/high luminance area) and an addition average value of the entire detected pixels. Accordingly, the pixel values thereof are compared, and it is determined whether or not the difference between the pixel values is greater than or equal to a predetermined value (step S103). When the difference therebetween is greater than or equal to the predetermined value, it is determined that both of the high luminance region and the low luminance region exist and that it is a luminance distribution of the high luminance region and the low luminance region of the surrounding dark part due to the illumination light in the backlight scene.

In order to improve the detection accuracy, the difference between the contour components 511 and 531 and the difference between the contour components 531 and 551, which are formed by the boundary between the high luminance region and the low luminance region due to the illumination light in the time differential image of the backlight scene in a dark place at the time of focusing, are compared to determined whether or not it is always positive. Also, the difference of the focus position information of the focus lens 20 is detected. From the correlation therebetween, it is determined whether or not the difference of the contour components is monotonically increased with respect to the difference of the focus position information (step S104).

In other words, the determination in which "when the focus position is moving from a focusing point to a non-focusing point, the variation in the focus differential signal value of the low luminance region side is always positive (monotonically increasing)" is made by determining whether the focus point is approaching the focusing position or moving away from the focusing position based on the peak position (focusing position) information of the focus position and the information on the variation of the focus position.

A peak position (focusing position) information acquisition unit stores the peak position information as the focus position information in the CPU 130 when the integral value in the frame of the focus differential signal value of the high luminance region side becomes the peak before the AF execution.

When it is determined by the band determination unit 116 that the band is close to the low luminance region (step S106), the focus differential signal value is considered as an invalid value and excluded from the addition target (step S107). On the other hand, when the band is not close to the low luminance region, if it is within the focus detection area, the focus differential signal value is added as an AF evaluation value as in the conventional case (step S105). Then, the focus differential signal value in the same frame is integrated by the same-frame integration circuit 114 and outputted as an AF evaluation value to the CPU 130 on a frame period basis (step S108).

As described above, in the CPU 130, the position of the focus lens 20 is changed within a predetermined AF sampling range, and the AF evaluation value inputted from the AF evaluation value calculation unit 110 is stored for each frame together with the focus lens position information. The maximum AF evaluation value detected by the evaluation value detection unit 130a among the stored AF evaluation values is considered as a focusing point, and the focus lens 20 is moved to the focus lens position at the time of focusing by the focus lens driving unit 80.

As described above, in accordance with the imaging apparatus according to the embodiment of the present invention, in the case of picking up an image of a backlight scene in a dark place where illumination light such as spot light or the like exists near the subject to be imaged, only the focus differential signal of the contour component of the subject is integrated and added, and the maximum value of the AF evaluation value can become close to the peak of the contour component of the original subject seen at the time of focusing. In addition, it is possible to reduce the influence of the contrast difference by the boundary between the high luminance region and the low luminance region formed due to the illumination light or the like, and also possible to improve the focus detection performance.

The configuration and the operation of the above-described embodiment are examples, and may be appropriately changed without departing from the scope of the present invention. For example, only the differential signal derived from the contour of the high luminance region may be integrated and subtracted from the integration result of all the contour components, instead of excluding the differential signal derived from the contour of the high luminance region from the integration. The results are equivalent in terms of calculation.

INDUSTRIAL APPLICABILITY

The present invention is used in an industry for manufacturing a digital camera and a digital video camera having an autofocus function.

DESCRIPTION OF REFERENCE NUMERALS

| | |
|---|---|
| 1: imaging apparatus | 10: zoom lens |
| 20: focus lens | 30: diaphragm mechanism |
| 40: imaging device | 50: imaging device control unit |
| 60: A/D conversion unit | 70: diaphragm driving unit |
| 80: focus lens driving unit | 90: zoom lens driving unit |
| 100: image signal processing unit | |
| 110: AF evaluation value calculation unit | |
| 111: HPF | |
| 112: absolute value processing unit | |
| 112: absolute value processing unit | |
| 113: focus gate signal generation unit | |
| 114: same-frame integration circuit | |
| 115: high luminance area determination unit | |
| 116: band determination unit | |
| 117: addition determination unit | |
| 118: time difference extraction unit | |
| 120: display unit | 130: CPU |
| 130a: maximum AF evaluation value detection unit | |
| 140: storage unit | 150: image recording medium |
| 160: manipulation unit | |
| 500: image of backlight scene in dark place at focusing | |
| 501: high luminance region formed due to illumination light | |
| 502: predetermined subject to be focused | |
| 510: time differential image511: contour component formed by boundary between high luminance region and low luminance region due to illumination light | |
| 512: contour component formed by predetermined subject 502 to be focused | |
| 520: backlight scene in dark place at non-focusing | |
| 521: high luminance region formed due to illumination light | |
| 530: time differential image531: contour component formed by boundary between high luminance region and low luminance region due to illumination light | |
| 540: backlight scene in dark place at further non-focusing | |
| (particularly, near end) | |
| 541: high luminance region formed due to illumination light | |
| 550: time differential image551: contour component formed by boundary between high luminance region and low luminance region due to illumination light | |

What is claimed is:

1. An imaging apparatus comprising:
an AF evaluation value calculation unit configured to calculate an AF evaluation value by integrating, in a single frame period, a focus differential signal value obtained from a focus differential signal generated by obtaining a high frequency component of a luminance signal included in an image signal obtained by photoelectric conversion of a subject image formed by a focus lens through an imaging device and time-differentiating the obtained luminance signal; and
a control unit configured to control a position of the focus lens to maximize the AF evaluation value based on the AF evaluation value inputted from the AF evaluation value calculation unit,
wherein the AF evaluation value calculation unit includes:
a high luminance region determination unit configured to extract a feature of each pixel value and determine whether or not the feature is a backlight scene in a dark place; and
a band determination unit configured to determine a band of a contour component of a subject,
wherein in the band determination unit, when the high luminance region determination unit determines the feature is a backlight scene in a dark place, a focus differential signal value on a low luminance region side in a contour component formed by a boundary between a high luminance region and a low luminance region due to backlighting is excluded from an object for the integration, and the AF evaluation value is calculated using only a focus differential signal value on the high luminance region side in the contour component of the subject to be focused as an object for the integration.

2. The imaging apparatus of claim 1, wherein the high luminance region determination unit determines whether or not the feature is a backlight scene in a dark place based on correlation of a difference between temporal variation of position information of the focus lens and temporal variation of contour components formed by the boundary between the high luminance region and the low luminance region due to the backlighting.

3. The imaging apparatus of claim 1, wherein the control unit includes a storage unit configured to store the AF evaluation value inputted from the AF evaluation value calculation unit together with position information of the focus lens.

4. The imaging apparatus of claim 2, wherein the control unit includes a storage unit configured to store the AF evaluation value inputted from the AF evaluation value calculation unit together with position information of the focus lens.

* * * * *